(12) United States Patent
Nakamura et al.

(10) Patent No.: US 7,896,552 B2
(45) Date of Patent: Mar. 1, 2011

(54) ROTARY ENCODER

(75) Inventors: Yoshiyuki Nakamura, Aikawa-machi (JP); Hiroshi Haga, Fuchu (JP)

(73) Assignee: Johannes Heidenhain GmbH, Traunreut (DE)

( * ) Notice: Subject to any disclaimer, the term of this patent is extended or adjusted under 35 U.S.C. 154(b) by 112 days.

(21) Appl. No.: 11/376,030

(22) Filed: Mar. 14, 2006

(65) Prior Publication Data

US 2006/0208173 A1    Sep. 21, 2006

(30) Foreign Application Priority Data

Mar. 18, 2005   (JP)   ............... 2005-079886

(51) Int. Cl.
*F16C 32/00* (2006.01)
*F16C 41/04* (2006.01)
(52) U.S. Cl. ................ 384/448; 29/602.1; 29/603.1
(58) Field of Classification Search .............. 29/607, 29/609, 602.1, 603.1, 577; 384/448
See application file for complete search history.

(56) References Cited

U.S. PATENT DOCUMENTS

| | | | |
|---|---|---|---|
| 4,319,188 A * | 3/1982 | Ito et al. ................ 324/173 |
| 4,988,945 A | 1/1991 | Nagase | |
| 6,789,948 B2 * | 9/2004 | Nakajima ............... 384/448 |
| 2003/0002123 A1 * | 1/2003 | Worner et al. .......... 359/216 |
| 2003/0059139 A1 * | 3/2003 | Nakajima ............... 384/448 |
| 2004/0165799 A1 * | 8/2004 | Nakajima et al. ....... 384/448 |
| 2004/0179760 A1 * | 9/2004 | Nakajima et al. ....... 384/448 |
| 2005/0058376 A1 * | 3/2005 | Oohira et al. ........... 384/448 |
| 2005/0200352 A1 * | 9/2005 | Haga et al. .......... 324/207.21 |

FOREIGN PATENT DOCUMENTS

| JP | 58-8568 | 2/1983 |
|---|---|---|
| JP | 63-83612 | 4/1988 |
| JP | 63-182808 | 7/1988 |
| JP | 6-7119 | 1/1994 |
| JP | 6-41853 | 6/1994 |
| JP | 6-331384 | 12/1994 |
| JP | 7-177707 | 7/1995 |
| JP | 9-243409 | 9/1997 |
| JP | 9-329609 | 12/1997 |
| JP | 2002-353029 | 12/2002 |

\* cited by examiner

*Primary Examiner*—Paul D Kim
(74) *Attorney, Agent, or Firm*—Kenyon & Kenyon LLP

(57) ABSTRACT

A rotary encoder includes a rotary shaft that may be manufactured easily and efficiently includes a rotating magnet with a mounting precision in which variance may not occur readily. A rotary shaft includes a rotary shaft main unit with a rotating magnet mounting part for mounting a rotating magnet and a ring-shaped rotating magnet that is formed integrally with this rotating magnet mounting part of the rotary shaft. In a method of manufacturing the rotary shaft, a ring-shaped rotating magnet is formed integrally with the rotary shaft mounting part of the rotary shaft main unit.

12 Claims, 5 Drawing Sheets

ROTARY ENCODER

CROSS-REFERENCE TO RELATED APPLICATIONS

The present application claims priority to Application No. 2005-079886 filed in Japan on Mar. 18, 2005, which is expressly incorporated herein in its entirety by reference thereto.

FIELD OF THE INVENTION

The present invention relates to rotary encoders and methods of manufacturing rotary shafts, e.g., rotary shafts of measuring devices and encoders that are mounted on objects to be measured that are rotating bodies, such as motors, and that detect the displacement—e.g., a number of rotations and/or the angle of rotation, as well as speed—of objects to be measured.

BACKGROUND INFORMATION

Among multiple rotation encoders there are those having magnetic rotating bodies—referred to as multiple rotation detection ring magnets—for the purpose of detecting one or more rotations, in addition to a structure for detecting the displacement within a single rotation, as described, for example, in Japanese Examined Patent Application Publication No. 6-41853. The multiple rotation encoder provides an optical absolute value encoder that detects the absolute angle within a single rotation, and a magnetic encoder for detecting multiple rotations. The optical absolute value encoder that detects the absolute angle within a single rotation is mounted on a shaft 1, and includes a rotating disk 2 for the purpose of detecting the absolute angle within a single rotation, an LED 4 for projecting light on rotating disk 2, an anchoring slit 5, a photodiode array 6 of light-receiving elements, a waveform shaping circuit for waveform shaping of detection signal therefrom into rectangular waves. The magnetic encoder for the purpose of detecting multiple rotations includes: a rotating disk 81 that is equipped with a magnet 82, referred to as a ring magnet, in the rotating part; a magnetoresistive element 9 for the purpose of detecting the number of rotations thereof; a waveform shaping circuit 10; and a control circuit for the purpose of counting the multiple rotation detection signals, and retaining the numeric values thereof.

The magnetoresistive element 9 is able to detect a single rotation by detecting changes in magnetic polarity when magnetic poles are reversed during a single rotation of the ring magnet 82. The structures and mounting positions of such optical system and magnetic system parts in encoders may have a variety of arrangement according to the type of encoder.

The magnetic pattern, whereby magnetic poles are reversed during a single rotation of the ring magnet, is magnetized in accordance with methods described, for example, in Japanese Published Patent Application No. 63-182808 and Japanese Published Patent Application No. 2002-353029. The magnetizing methods all involve magnetizing in the state of a single ring magnet, and the magnetized ring magnet is thereafter attached to the rotary shaft of the encoder. Position determination is performed by, for example, matching a mark for determining position attached to the ring magnet with a mark for determining the position of the encoder rotary shaft.

However, it is believed to be difficult to perform attachment operations while confirming the position determination marks, and there are believed to be frequent variances in the position of the attached ring magnet. There also believed to be a need to improve operational efficiency, since there is believed to have been a great burden on workers.

SUMMARY

According to example embodiments of the present invention, a rotary encoder includes a rotary shaft may be provided that may be manufactured easily and efficiently, and furthermore may have a rotating magnet with a mounting precision in which variance does not occur readily.

According to example embodiments of the present invention, a multiple rotation encoder includes the foregoing rotary shaft.

Example embodiments of the present invention provide a rotary shaft manufacturing method.

Example embodiments of the present invention may provide a rotary shaft that simplifies manufacturing, improves operational efficiency, either simplifies operations for determining position or renders them unnecessary, and in which there may be very little variance in mounting precision.

In addition, when example embodiments of the present invention are applied to multiple rotation encoders, e.g., alignment of the rotating magnet for the detection of multiple rotations may be unnecessary. Furthermore, it may be possible to concomitantly use the position determination mark, which may be required for mounting the slit plate for position detection within a single rotation, as a magnetization position mark, and it also may be possible to simplify and improve the efficiency of the position determination structure and position determining operations.

According to an example embodiment of the present invention, a rotary encoder includes a rotary shaft, which includes: a rotary shaft main unit including a rotating magnet mounting part adapted to mount a rotating magnet; and a ring-shaped rotating magnet formed integrally with the rotating magnet mounting part.

The rotating magnet mounting part may include a groove structure adapted to secure the rotating magnet in the rotating magnet mounting part.

The rotary encoder may include a structure adapted to establish a standard position of magnetization.

The rotary encoder may include a code disk arranged above the rotating magnet, and the rotary encoder may be adapted to generate absolute position information within one revolution of the rotary shaft.

The groove structure may have a trapezoidal shape, e.g., a trapezoidal shape that tapers inwardly in a direction toward the rotating magnet.

The groove structure may include sawtooth-shaped indentations.

The groove structure may be formed at least partially within a circumference of the rotating magnet.

The structure that is adapted to secure the rotating magnet in the rotating magnet mounting part may include a position determination hole arranged in a flange-shaped rotary shaft mounting part of the rotary shaft.

The rotating magnet may include a bond magnet.

According to an example embodiment of the present invention, a method of manufacturing a rotary shaft, which includes a rotary shaft main unit including a rotating magnet mounting part for mounting a rotating magnet, includes: integrally forming a ring-shaped rotating magnet with the rotating magnet mounting part; and after the forming step, performing a magnetization treatment.

The method may include determining a magnetic pole position of the magnetization with respect to a standard position established for the rotary shaft.

Example embodiments of the present invention are described in more detail below with reference to the appended Figures.

DETAILED DESCRIPTION

A rotary shaft includes a rotary shaft main unit having a rotating magnet mounting part for mounting a rotating magnet, and a ring-shaped rotating magnet that is formed integrally with the rotating magnet mounting part of the rotary shaft. A groove structure may be provided for securing the rotating magnet in the rotating magnet mounting part. This rotary shaft may be used in an encoder of the multiple rotation type, etc.

Forming the rotating magnet so as to be integral to the rotary shaft in this manner may eliminates the need for determining the position of the rotating magnet while attaching it, manufacture may be simplified, and variance in rotating magnet mounting precision may be reduced. Thus, it may be possible to very precisely regulate the magnetization position of the rotating magnet by magnetizing it after the rotating magnet has been formed integrally with the rotary shaft. Furthermore, when forming the rotating magnet integrally with the rotary shaft, position determination may be unnecessary because the rotating magnet is not magnetized, and manufacture may also be greatly simplified.

It may also be possible to determine position very easily and precisely if position is determined mechanically, using the position determination structure and shape of the rotating magnet when magnetizing.

Furthermore, when this rotary shaft is used in a multiple rotation recorder, no operation for aligning the rotating magnet may be necessary for detecting multiple rotations, and it may be possible to concomitantly use the position determination mark or structure, which may be required for mounting the slit plate for position detection within a single rotation, as a magnetization position mark. It may also be possible to simplify and improve the efficiency of the position determination structure and position determining operations.

Figure 1:
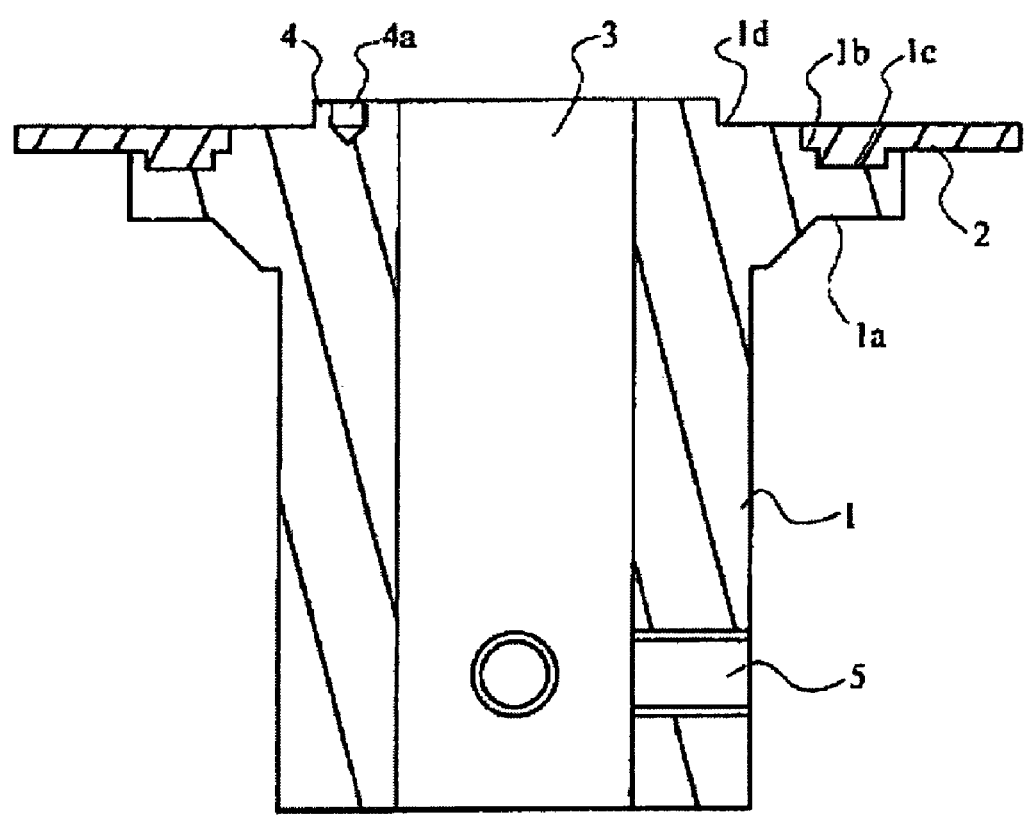
FIG. 1 is a cross-sectional view of a rotary shaft of a rotary encoder according to an example embodiment of the present invention.
Figure 2:
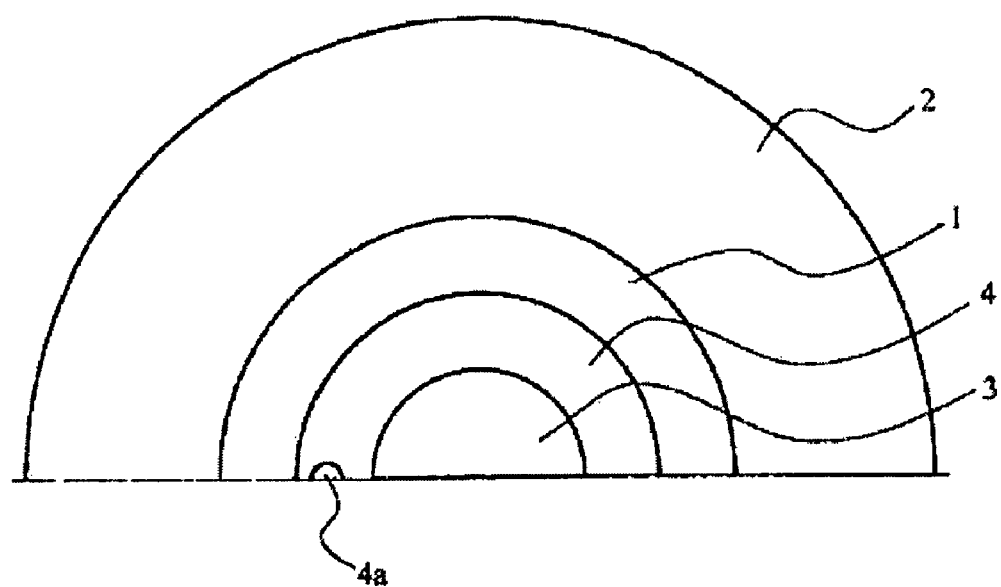
FIG. 2 is a plan view of the rotary shaft illustrated in FIG. 1.

FIG. 1 is a cross-sectional view illustrating a rotary shaft according to an example embodiment of the present invention. FIG. 2 is a plan view with half of the surface omitted. As illustrated in the Figures, the rotary shaft includes a rotary shaft main unit 1 and a rotating magnet 2, which is formed such that it is integrated with rotary shaft main unit 1.

Near one end of bell-shaped rotary shaft main unit 1 (the upper end as illustrated), there is a rotary shaft mounting part 1a that is of a diameter-expanding flange shape, and the rotating magnet 2 is formed integrally with the step-shaped rotating magnet mounting part 1b, which is formed on the rotary shaft mounting part 1a. A groove 1c is formed in the rotating magnet mounting part 1b, so that the rotating magnet 2 may not be too readily pulled off or otherwise removed. This groove 1c may be formed in various shapes, as discussed below, and they may be either combined or omitted.

Figure 3:
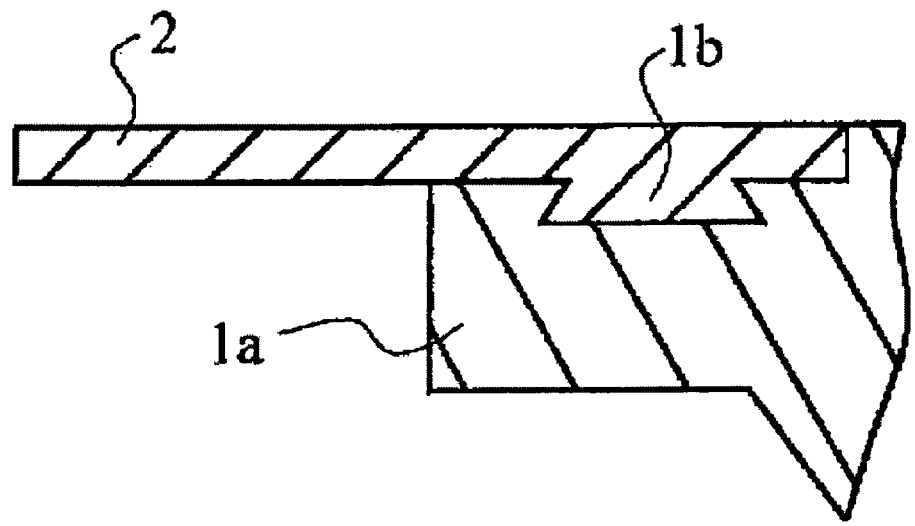
FIG. 3 is a partial cross-sectional view illustrating an alternative groove shape.
Figure 4:
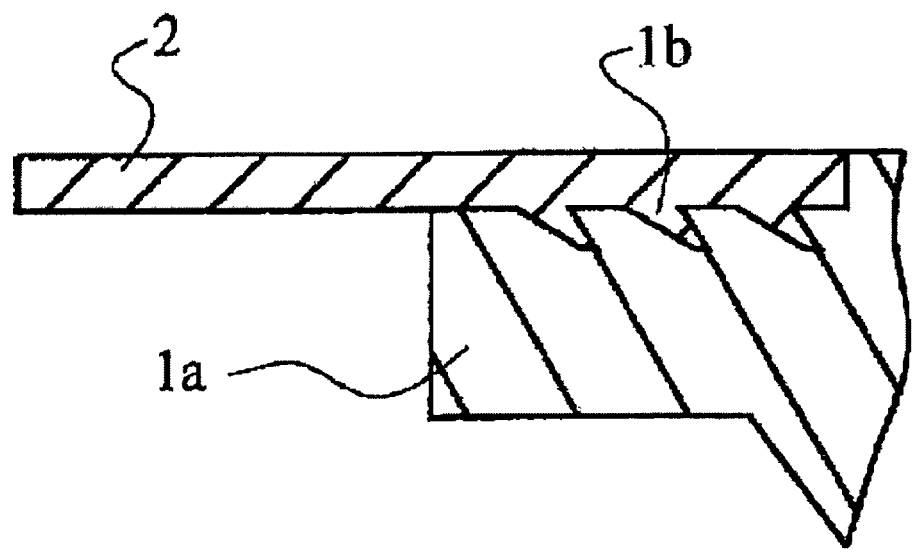
FIG. 4 is a partial cross-sectional view illustrating another alternative groove shape.

For example, a structure that is difficult to dislodge may be formed by forming a cross-section that is trapezoid-shaped toward the rear, as illustrated in FIG. 3, since it is matched so as to dovetail with the material of the rotating magnet 2, which is formed directly inside thereof. Or, as illustrated in FIG. 4, sawtooth-shaped indentations may be formed by arranging multiple triangular indentations. The material of the rotating magnet 2 is formed into a shape such that multiple wedges are driven into the rotary shaft main unit, and in this example the structure may be difficult to dislodge. FIGS. 3 and 4 are enlarged partial cross-sectional views of the rotary shaft mounting part 1a illustrated in FIG. 1. It should be understood that these groove 1c shapes and structures are merely exemplary and that various modifications and combinations are possible.

This type of groove 1c may either be formed entirely within the circumference in which the rotating magnet is formed, or else only partially formed therein. The shape and structure of the part of groove 1c within the circumference may also be changed. In this manner, by not forming the groove within the circumference, and changing the shape and structure thereof, it is possible to improve connection and attachment strength in the rotational direction of the rotating magnet, and this may also be effective for rotation prevention.

In the example as illustrated and described above, the rotary shaft mounting part 1a is flange-shaped, but the rotating magnet mounting part does not have to be formed in a flange shape. A portion of a flat rotary shaft may be also be used as the rotating magnet mounting part, and conversely, an indentation may be established and used as the rotating magnet mounting part. The shape of the rotary shaft mounting part may be optimally formed in consideration of the size and shape of the rotating magnet formed and the required strength and space, etc.

There is a through-hole 3 in the rotary shaft main unit 1 for mounting the rotary shaft of the object to be measured, which is a rotating body, and at least one screw hole 5 is formed in the other end (the lower end as illustrated), for insertion of a locking screw for securing it to the rotary shaft of the object to be measured.

Figure 5:
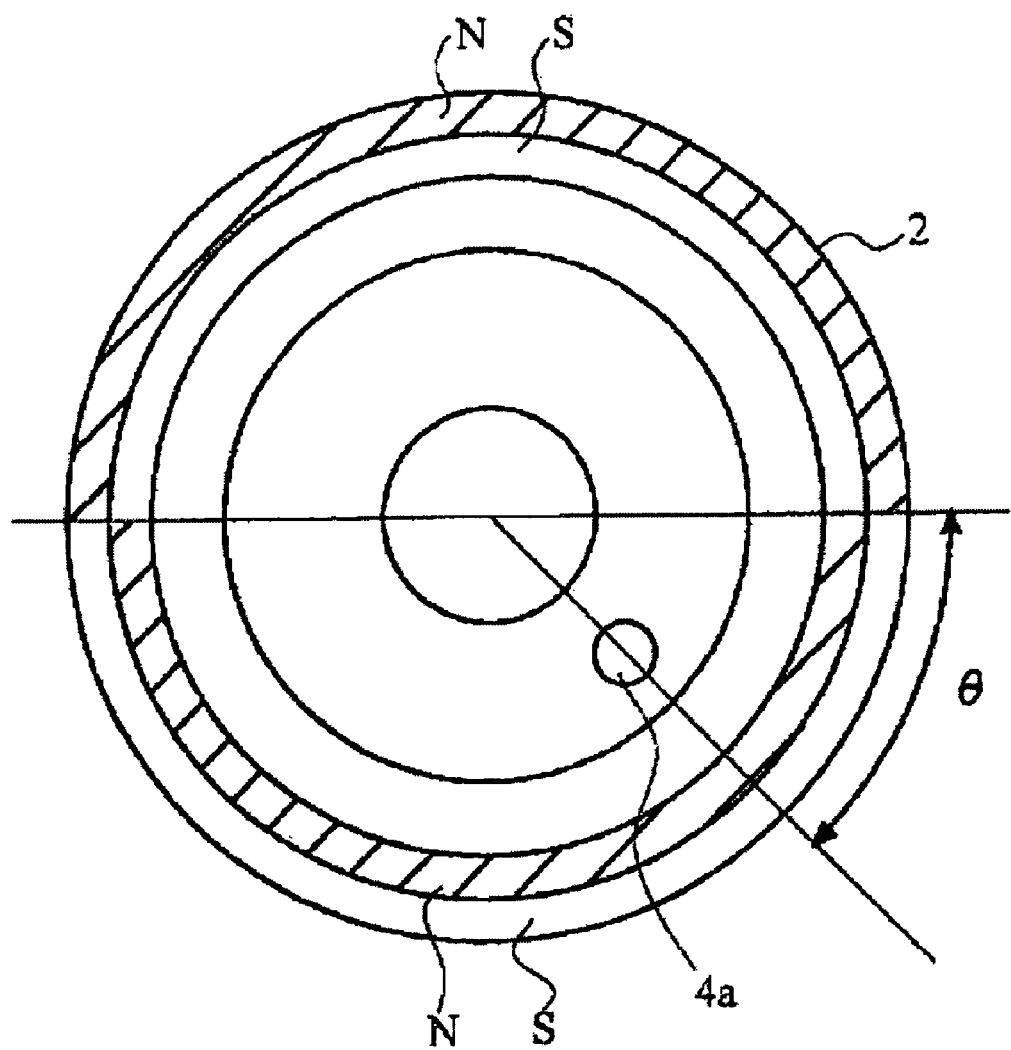
FIG. 5 schematically illustrates a relationship between a magnetization pattern of a rotating magnet and a position determination hole.

A position determination hole 4a is formed in the end surface 4 at one end of the rotary shaft main unit 1 for the purpose of mechanically determining position at the time of magnetization, and this is capable of mechanically securing the position. Specifically, magnetization may be performed such that magnetic poles occur mutually at a specific pre-set angle $\theta$ of the magnetic pole, with respect to the position determination hole 4a, as illustrated in FIG. 5, for example. If, at that time, position is secured with respect to the position determination hole 4a, using a position determination pin, etc., and the angle of the magnetic pole of a magnetizing device is secured at $\theta$ with respect to this position determination pin, the magnetization pattern of the rotating magnet that is magnetized will be as illustrated in FIG. 5.

The position determination structure need not be a position determination hole as in the example illustrated in the Figure. Rather, a groove, notch, screw, D cut, etc., may also be used for determining position. It is also possible to make at least a part of the shape of the rotating body asymmetrical (rotationally asymmetrical), and to make that part capable of determining position.

In this manner, magnetization is possible during mechanical position determination. Therefore, position determination of the rotating magnet may be easily, repeatedly, and precisely performed. In addition, the rotary shaft main unit 1 and rotating magnet 2 are formed integrally, and therefore, no gaps may occur between the two, and as a result, it is possible to obtain a rotating shaft, with attached rotating magnet, having very high precision and very low variance.

The rotary shaft manufacturing method hereof is described below. In the rotary shaft manufacturing method, a ring-shaped rotating magnet is formed to be rotationally symmetrical, and is molded in a rotating magnet mounting part integrally with a rotary shaft main unit having such a rotating magnet mounting part for mounting a rotating magnet, and thereafter a magnetizing process is performed, and the positions of the magnetic poles magnetized may be determined with respect to standard positions established on the rotary shaft.

A more specific example of a manufacturing method is described below. First, a rotary shaft main unit having a flange-shaped rotary shaft mounting part 1a, as illustrated for example in FIG. 1, is prepared. Next, a mold for forming a space in which to form a rotating magnet 2, to be paired with the rotary shaft main unit, is prepared. This mold may be arranged on the rotary shaft main unit side, and the pair thus formed is arranged on the opposite side, that is, on the side opposite the rotary shaft main unit. However, multiple molds may also be combined.

Next, these molds are combined, and, by making them function as rotary shaft main unit molds as well, space for forming the rotating magnet is formed, and the raw material for the rotating magnet is injected in the space formed, thus forming the rotation magnet. Otherwise, the raw material is simply arranged in the forming space location, and formation may be accomplished through the application of pressure.

The raw material for the rotating magnet is a so-called bond magnet, and is manufactured by combining and molding a magnetic powder, such as an alloy of hard ferrite and a rare earth, with a thermosetting resin such as epoxy resin, phenol resin, or polyester resin, or a thermoplastic resin such as polyamide resin, polypropylene resin, or polyphenylene sulfide resin, as a binder, etc.

For example, a thermoplastic resin may be used as a binder for injection molding and extrusion molding. Magnetic powder may be mixed and kneaded into this binder while the latter is in a thermally molten state, and thereafter this mixture is pulverized or granulated into particles (referred to as pellets) that may be supplied to a molding machine, and molding is performed by supplying these pellets to an injection molding machine or an extrusion molding machine. Molding temperature varies according to the type of binder, but it is higher than for press molding, e.g., 200 to 250° C. for polypropylene resin and 250 to 300° C. for polyamide resin.

The molded rotating magnet is magnetized as needed through a curing process. As mentioned above, magnetization may be performed in accordance with the methods described in Japanese Published Patent Application No. 63-182808 and/or Japanese Published Patent Application No. 2002-353029, each of which is expressly incorporated herein in its entirety by reference thereto.

A standard position that is established on the rotary shaft, for example, position determination hole 4a, may be magnetized as a standard. That is, it may be possible to determine position very easily, precisely, and with good reproducibility by magnetizing a position that is determined mechanically through insertion of a position determination lock pin, etc., into position determination hole 4a, and variance in magnetization position may not occur readily.

As described above, a rotating shaft with an attached rotating magnet having very high precision and very low variance in magnetization position may thus be manufactured. It should be understood that the foregoing manufacturing method is merely exemplary.

A rotary shaft hereof may be used in various types of encoders and tachometric devices. Among these include encoders for detecting multiple rotations.

Figure 6:
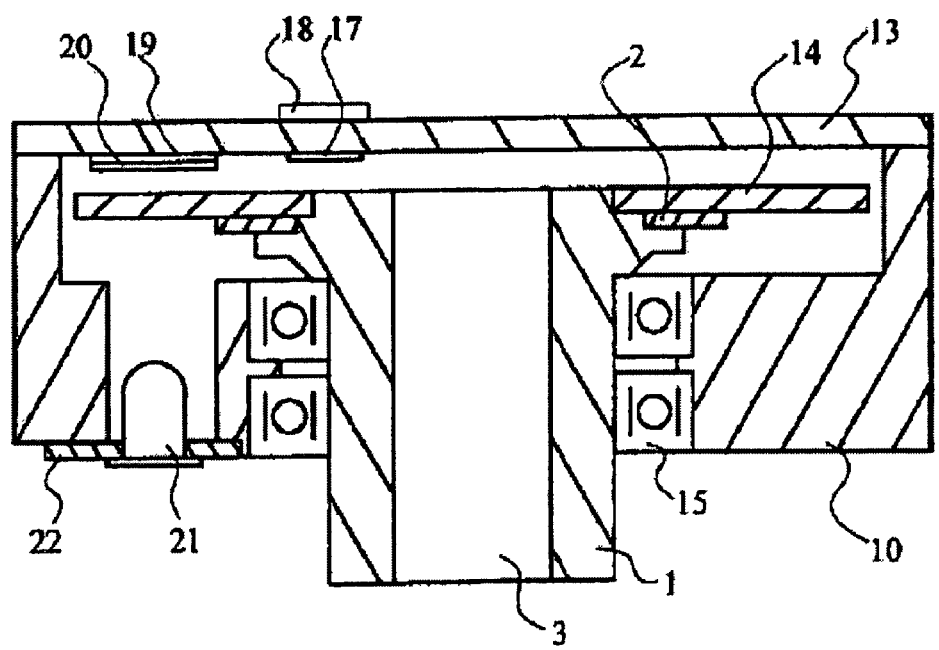
FIG. 6 is a cross-sectional view of a multiple rotation encoder having a rotary shaft according to an example embodiment of the present invention.

FIG. 6 is a cross sectional view of an encoder that includes a rotary shaft hereof. A multiple rotation encoder that has an optical part for detecting the displacement within a single rotation and a magnetic rotation factor part is described as an example.

As illustrated, the encoder is attached to an object to be measured, and it includes: rotary shaft 1 engaged with the object to be measured; bearing 15, which rotatably supports rotary shaft 1; and base material 10, to which the bearing is attached. A through-hole 3, of approximately the same diameter as rotary shaft 1, is arranged so that the shaft of the rotating body that is the aforementioned object to be measured may be mounted on the lower side thereof. In addition, flange-shaped rotary shaft mounting part 1a is formed on the upper support of bearing 15, and code disk (e.g., slit plate) 14 is attached to the upper end thereof. Rotating magnet 2 is attached to the lower surface for attachment with code disk (e.g., slit plate) 14 of rotary shaft mounting part 1a, to form a single unit with rotary shaft 1.

Substrate 13, which is secured in base material 10, is arranged facing the upper portion of code disk 14. Light receiving element 19, which is provided with fixed slit 20, is arranged in a position corresponding to the location in which the coding (e.g., slit) of code disk 14 is formed, and is electrically connected to the circuit on the substrate. Light emitting element 21 is arranged below the light receiving element 19 attachment position of code disk 14. The light emitted from this light emitting element 21 is detected by the light receiving element via the code disk slit and the fixed slit. Light emitting element 21 is supported by support substrate 22, which is fixed in encoder base material 10. It should be appreciated that these optical systems may be replaced with a magnetic system using, for example, a code disk (e.g., magnetic code disk) and a magnetic detection element.

The magnetic detection element 17, which is for the purpose of detecting magnetic poles or magnetic changes in the lower surface of the substrate that is above the rotating magnet 2, via code disk 14, is arranged facing the surface of the ring of the rotating magnet. Bias magnet 18 is arranged on the upper surface side of the aforementioned substrate 13, facing the attachment position of the magnetic detection element 17, in order to impart a bias magnetic field to this magnetic detection element 17. The magnetic detection element 17, bias magnet 18, and substrate 13 are mechanically and electrically connected to substrate 13. A cover may be provided for covering the entire main unit, including substrate 13 and base material 10.

For a multiple rotation absolute encoder, it may be necessary to match the positional relationship of the rotating magnet used for detecting multiple rotations and the code disk used for detecting a single rotation in order to match the phase of the ordinary output signal. In addition, it may also be necessary to match the positional relationship to the rotary shaft. For example, a mark that is a standard part, such as a screw, D-cut, notch, etc., may be used for the purpose of matching the position of the rotary shaft.

An operation is performed for matching the position of the code disk for detecting a single rotation (output signal origin) in relation to the standard position of the rotary shaft, for example a screw, D-cut, notch, etc., and also to mechanically or electrically match the position of the rotating magnet for detecting multiple rotations to the position of the code disk for detecting a single rotation.

However, if the rotary shaft hereof is used, the entire alignment operation may be completed simply by matching the position of the code disk for detecting a single rotation to the standard mark on the shaft. That is, the rotating magnet for detecting multiple rotations is formed directly in the rotary shaft, and is magnetized in alignment with the standard mark on the shaft. Therefore, the rotating magnet alignment operation may be unnecessary.

In addition to a rotating magnet alignment operation being rendered unnecessary by using the rotary shaft hereof in this manner, the mark used for alignment when magnetizing (position determination structure) may also be used to align the code disk for detecting a single rotation, thus making it possible to curtail operational processes, and greatly improve operational efficiency.

In the example depicted, it is also possible to arrange the rotating magnet 2 below the code disk (e.g., slit plate) 4, integrally with rotary shaft 1. It is also possible to narrow the gap between substrate 13 and code disk 14 by removing the rotating magnet 2 from the space forming a gap between substrate 13 and code disk 14 to further optimize the gap. In addition, the positional relationship of the rotating magnet, the bias magnet, and the magnetic detection element are arranged at nearly equal intervals, and it is possible to optimize the positional relationship of the magnetic rotating body, the bias magnet, and the magnetic detection element.

The foregoing may be applied to industrial equipment, such as robots and automated machinery, position detectors for all of the movable parts of mobile objects, such as automobiles and airplanes, and measuring instruments and encoders used to detect rotations, etc. The foregoing may be a particularly suitable technology in multiple rotation absolute encoders but may also be provided in magnetic encoders, etc.

LIST OF REFERENCE CHARACTERS

1 Rotary shaft main unit
1a Rotary shaft mounting part
2 Rotating magnet
3 Through-hole
11 Base material
13 Substrate
14 Code disk
15 Bearing
17 Magnetic detection element
18 Bias magnet
19 Light receiving element
20 Fixed slit
21 Light emitting element
22 Support substrate

What is claimed is:

1. A rotary encoder, comprising:
    a rotary shaft including:
        a rotary shaft main unit including a rotating magnet mounting part adapted to mount a rotating magnet;
        a ring-shaped rotating magnet integrally molded with the rotating magnet mounting part; and
        a code disk arranged above the rotating magnet, the code disk configured to generate absolute position information within one revolution of the rotary shaft.

2. The rotary encoder according to claim 1, wherein the rotating magnet mounting part includes a groove structure adapted to secure the rotating magnet in the rotating magnet mounting part.

3. The rotary encoder according to claim 2, wherein the groove structure has a trapezoidal shape.

4. The rotary encoder according to claim 2, wherein the groove structure has a trapezoidal shape that tapers inwardly in a direction toward the rotating magnet.

5. The rotary encoder according to claim 2, wherein the groove structure includes sawtooth-shaped indentations.

6. The rotary encoder according to claim 2, wherein the groove structure is formed at least partially within a circumference of the rotating magnet.

7. The rotary encoder according to claim 1, further comprising a structure adapted to establish a standard position of magnetization.

8. The rotary encoder according to claim 7, wherein the structure includes a position determination hole arranged in a flange-shaped rotary shaft mounting part of the rotary shaft.

9. The rotary encoder according to claim 1, wherein the rotating magnet includes a bond magnet.

10. The rotary encoder according to claim 1, wherein the rotating magnet includes a magnetic powder and at least one of (a) a thermosetting resin and (b) a thermoplastic resin.

11. The rotary encoder according to claim 10, wherein the magnetic powder includes an alloy of hard ferrite and a rare earth metal, the thermosetting resin includes at least one of (a) an epoxy resin, (b) a phenol resin, and (c) a polyester resin, and the thermoplastic resin includes at least one of (a) a polyamide resin, (b) a polypropylene resin, and (c) a polyphenylene sulfide resin.

12. The rotary encoder according to claim 1, wherein the code disk includes a slit plate.

* * * * *